United States Patent [19]
Drumright et al.

[11] Patent Number: 5,854,375
[45] Date of Patent: Dec. 29, 1998

[54] MELT POLYMERIZATION PROCESS FOR PREPARING AROMATIC POLYESTERS

[75] Inventors: Ray E. Drumright; James Lee Brewbaker; William B. Marshall, all of Midland, Mich.

[73] Assignee: The Dow Chemical Company, Midland, Mich.

[21] Appl. No.: 782,436

[22] Filed: Jan. 15, 1997

[51] Int. Cl.$^6$ .......................... C08G 63/87; C08G 63/52; C08G 63/16

[52] U.S. Cl. .......................... 528/286; 528/192; 528/194; 528/302; 528/308

[58] Field of Search .................... 528/286, 194, 528/302, 308, 192

[56] References Cited

U.S. PATENT DOCUMENTS

| | | | |
|---|---|---|---|
| 4,256,624 | 3/1981 | Calundann | 528/190 |
| 4,330,457 | 5/1982 | East et al. | 524/602 |
| 4,393,191 | 7/1983 | East | 528/207 |
| 4,473,682 | 9/1984 | Calundann et al. | 524/605 |
| 4,539,386 | 9/1985 | Yoon | 528/183 |
| 4,612,360 | 9/1986 | Ort | 528/182 |
| 4,841,009 | 6/1989 | Kelsey | 528/192 |
| 4,889,911 | 12/1989 | Pielartzik et al. | 528/182 |
| 5,015,722 | 5/1991 | Charbonneau et al. | 528/190 |
| 5,110,896 | 5/1992 | Waggoner et al. | 528/190 |
| 5,136,013 | 8/1992 | Arlt et al. | 528/192 |
| 5,412,061 | 5/1995 | King, Jr. et al. | 528/198 |
| 5,461,089 | 10/1995 | Handyside et al. | 523/171 |
| 5,466,774 | 11/1995 | Kanno et al. | 528/199 |
| 5,494,952 | 2/1996 | Hirata et al. | 524/139 |
| 5,494,992 | 2/1996 | Kanno et al. | 528/196 |
| 5,496,910 | 3/1996 | Mang et al. | 528/88 |
| 5,502,118 | 3/1996 | Macholdt et al. | 525/437 |
| 5,510,404 | 4/1996 | Nakae et al. | 524/99 |
| 5,563,016 | 10/1996 | Baur et al. | 430/110 |
| 5,563,209 | 10/1996 | Schumann et al. | 524/709 |
| 5,614,599 | 3/1997 | Bales et al. | 528/194 |

FOREIGN PATENT DOCUMENTS 3-097727  4/1991  Japan .

*Primary Examiner*—Tae Yoon

[57] ABSTRACT

A process for preparing a polyester which includes the step of heating a reaction mixture comprising (i) diesters of dihydric phenols and $C_{1-10}$ aliphatic monoacids, (ii) aromatic dicarboxylic acids, and (iii) a catalytic amount of an organic cation-containing salt at a temperature above the melt temperature of the diesters, under reaction conditions sufficient to form the corresponding polyester. Use of this process subjects the polymers prepared thereby to a thermal history which causes relatively little deterioration of the polymer's properties.

27 Claims, 1 Drawing Sheet

MELT POLYMERIZATION PROCESS FOR PREPARING AROMATIC POLYESTERS

BACKGROUND OF THE INVENTION

This invention relates to methods for preparing polyesters, particularly melt processes in which the polymerization is carried out with the reaction mixture in a molten state.

Methods for the preparation of polyesters are well-known and generally comprise reacting diols or derivatives of diols with dicarboxylic acids or derivatives of dicarboxylic acids in a solution, interfacial, or melt process. Industrially, melt processes are preferred over solution or interfacial processes because there is no expensive solvent recycle or waste stream. Occasionally, because of a polymer's poor solubility in conventional solvents, the only feasible method of synthesizing the polymer is by a melt process. This is generally the case with polyesters containing a high proportion of aromatic groups, such as liquid crystalline polyesters.

Examples of melt processes for the preparation of polyesters include acylation reactions between acid chlorides and diols, condensation reactions between carboxylic acids and diols, and exchange reactions between dicarboxylic acid esters and diols, acetates of diols and dicarboxylic acids, or acetates of hydroxy carboxylic acids. Polymerization reactions involving the reaction of acetates with acids are known as melt acetolysis and are generally preferred for the preparation of aromatic-containing polyesters. Melt acetolysis polymerization reactions may be carried out in the absence of a catalyst, but the use of basic catalysts such as a metal acetate or oxide is known and described, for example, in U.S. Pat. No. 4,256,624. The use of an imidazole polymerization catalyst in such processes is described in U.S. Pat. No. 4,612,360. If acetates of hydroxy carboxylic acids are employed as the reactants in a melt acetolysis reaction, such acids typically form a fairly homogeneous melt of a monomer which self-polymerizes to form an AB-type polymer. Even if more than one type of acetate/acid is employed, such compounds typically melt at a temperature lower than the melt temperature of the polymer prepared therefrom, are fairly soluble with respect to each other, and copolymerize from a relatively homogeneous reaction mixture to form a polymer.

However, the reaction mixtures of melt acetolysis processes utilizing diacetates and aromatic dicarboxylic acids as monomers are often substantially heterogeneous. Aromatic dicarboxylic acids typically melt at extremely high temperatures and have poor solubility in the diacetates. Because the aromatic dicarboxylic acid is a solid at typical reaction temperatures for melt processes, reaction rates are slow, molecular weight build of the polymer is slow, and monomers and low molecular weight oligomers sublime from the reaction mixture (due to the increased temperature and residence time necessary to get the reaction to proceed). Such sublimation affects the polymerization stoichiometry and makes further molecular weight build difficult, which necessitates further increases in the reaction temperature. The thermal history of the polymer prepared thereby may cause severe deterioration of the physical properties of the polymer, such as modulus, tensile strength, elongation, and heat distortion temperature.

SUMMARY OF THE INVENTION

In one aspect, this invention is a process for preparing a polyester which includes the step of heating a reaction mixture comprising (i) diesters of dihydric phenols and $C_{1-10}$ aliphatic monoacids, (ii) aromatic dicarboxylic acids, and (iii) a catalytic amount of an organic cation-containing salt at a temperature above the melt temperature of the diesters, under reaction conditions sufficient to form the corresponding polyester.

In a second aspect, this invention is a process for preparing a polyester which includes the step of heating a reaction mixture comprising (i) diesters of dihydric phenols and $C_{1-10}$ aliphatic monoacids, (ii) dicarboxylic acids, and (iii) a catalytic amount of an organic cation-containing salt and, optionally, (iv) compounds containing one carboxylic acid group and one aliphatic ester group derived from a phenolic group, under reaction conditions sufficient to form the corresponding polyester, wherein at least 20 mole percent of the combined molar amount of (ii) and (iv) are aromatic dicarboxylic acids.

It has been discovered that the processes of the invention provide means to prepare polymers containing ester groups derived from the diesters and diacids described above using a melt process, which subjects the polymers prepared thereby to a thermal history which causes relatively little deterioration of the polymer's properties. The use of a catalytic amount of an organic cation-containing salt as the polymerization catalyst allows the polymerization reaction to proceed at a relatively lower temperature, at a faster rate, or both. These and other advantages of the invention will be apparent from the description which follows.

DETAILED DESCRIPTION OF THE INVENTION

Figure 1:
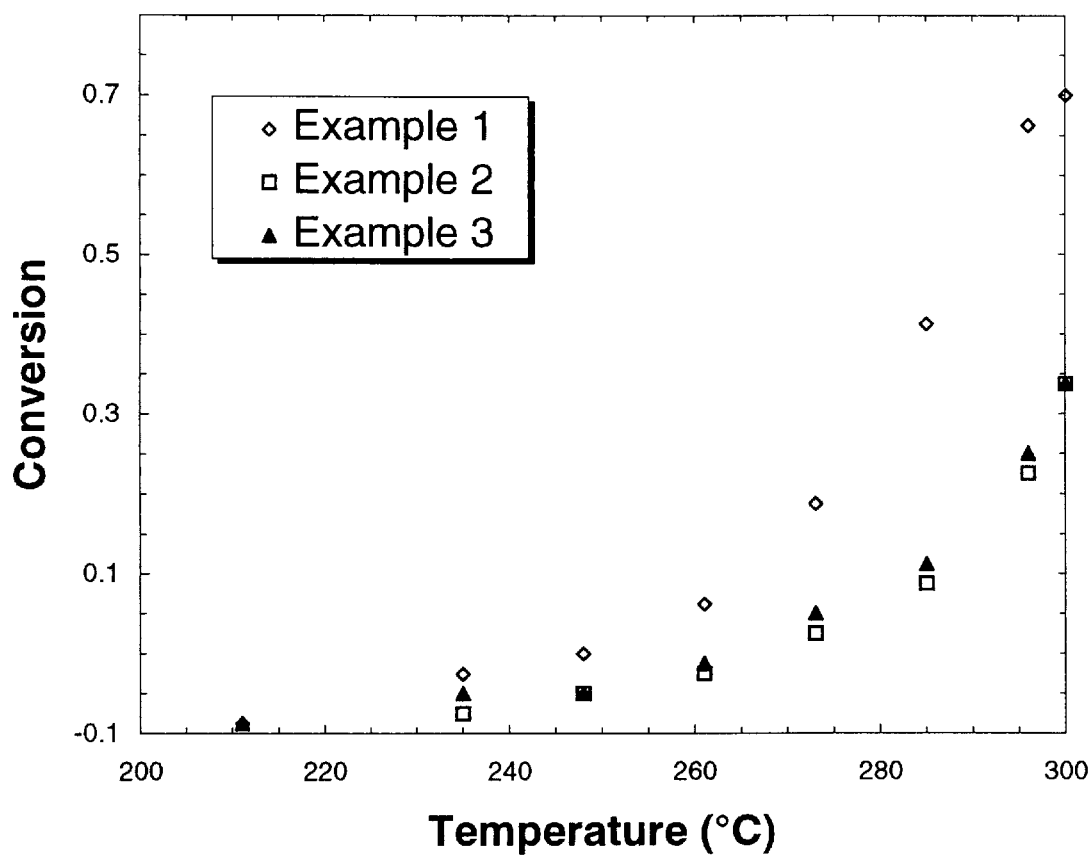
FIG. 1 shows a plot of the conversion data obtained for Examples 1 to 3.

The term "polyester" as used herein refers to a polymer containing ester groups derived from an acidolysis reaction between a carboxylic acid group and an aliphatic ester group derived from a phenolic group. However, this term does not exclude the presence of other groups in the polymer, such as carbonate or amide, which may form as the result of the presence of other monomers in the reaction mixture. The term "catalytic amount" as used herein means an amount of the organic cation-containing salt which will increase the rate of reaction between the acid and diester at a temperature above the melting point temperature of the diester, relative to the same reaction carried out in the absence of the salt. Preferably, the catalyst is present in an amount, based on the number of moles of dicarboxylic acid added to the reaction mixture, of at least 0.001 percent, more preferably at least 0.05 percent, and most preferably at least 0.1 percent; but preferably no greater than 5 percent, more preferably no greater than 1.0 percent, and most preferably no greater than 0.5 percent.

Organic cation-containing salts suitable for use in the process of the invention include alkyl- or aryl-substituted phosphonium, arsonium, ammonium, and sulfonium salts. The alkyl or aryl substituents of such salts preferably each have less than 20 carbon atoms, more preferably less than 12 carbon atoms, and are most preferably each butyl or phenyl. Preferably, the salt is an ammonium or phosphonium salt. Examples of cations of such salts include tetraphenylphosphonium, tetrabutylphosphonium, ethyltriphenylphosphonium, bis(triphenylphosphoranylidene)-ammonium, and pyridinium. The anion associated with the cation may be either organic or inorganic. Examples of suitable anions include carboxylate, alkoxide, phenate, halide, carbonate, bicarbonate, sulfate, nitrate, and hydrogen sulfate, but is preferably acetate or a halide.

The term "dihydric phenols" as used herein means a compound having two hydroxyl groups attached to the same or different aromatic groups. Examples of such include hydroquinone; resorcinol; 4,4'-dihydroxybiphenyl; 2,6-dihydroxynaphthalene; 9,9-bis(4-hydroxyphenyl)fluorene; 1,1- and 1,2-bis(4-hydroxyphenyl)ethane ("bisphenol E"); bis(4-hydroxyphenyl)methane ("bisphenol F"); bis(4-hydroxyphenyl)sulfide; 2,2-bis(4-hydroxyphenyl)propane ("bisphenol A"); bis(hydroxyphenyl)oxide; bis(4-hydroxyphenylsulfone), as well as stilbene diols.

Examples of stilbene diols include those of the formula:

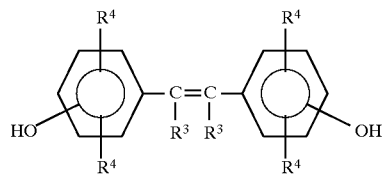

wherein $R^3$ independently in each occurrence is selected from the group consisting of hydrogen, $C_{1-8}$ alkyl, chlorine, bromine, and cyano, but is preferably hydrogen or $C_{1-8}$ alkyl; $R^4$ independently in each occurrence is selected from the group consisting of hydrogen, halogen, alkyl, aryl, alkoxy, aryloxy, cyano, nitro, carboxamide, carboximide, and $R^5$—C(O)—, wherein $R^5$ is $C_{1-8}$ alkyl or aryloxy, but $R^4$ is preferably hydrogen or $C_{1-8}$ alkyl. Preferably, the phenolic groups are in a "trans" configuration about the double bond. Preferably, the stilbene diol is 4,4'-dihydroxystilbene; 4,4'-dihydroxy-alpha-methylstilbene; 4,4'-dihydroxy-alpha, alpha'-dimethylstilbene; or 4,4'-dihydroxy-alpha,alpha'-diethylstilbene. Such stilbene diols may be prepared by any suitable method. For example, the diol is prepared from a phenol and a carbonyl-containing precursor, using any of the procedures described by S. M. Zaheer et al., Part 3 in *J. Chem. Soc.*, pp. 3360–3362 (1954); V. Percec et al. in *Mol. Cryst. Liq. Cryst.*, Vol. 205, pp. 47–66 (1991); Singh et al., *J. Chem. Soc.*, p. 3360 (1954), or by Hefner et al. in U.S. Pat. No. 5,414,150.

Diesters of the aromatic diols may be prepared by reacting the diol with an acid chloride or acid anhydride of a $C_{1-10}$ aliphatic monoacid. Since the corresponding aliphatic acid will form from the ester group during the polymerization reaction and such acid may be conveniently removed from the reaction mixture by distillation therefrom, the acid used to prepare the diester is preferably selected so that the boiling point of the corresponding acid, relative to the desired polymerization reaction temperature, permits this to occur. Preferably, the acid chloride or anhydride is one derived from a $C_{2-4}$ acid, and is most preferably acetyl chloride or acetic anhydride.

The reaction to form the diester may be carried out in the presence of an acid or base catalyst, either prior to or in situ in the polymerization reaction mixture.

The diester is preferably selected from the group consisting of hydroquinone diacetate; resorcinol diacetate; 4, 4'-dihydroxybiphenyl diacetate; 4,4'-dihydroxy-diphenyl ether diacetate; 4,4'-dihydroxystilbene diacetate; 4,4'-dihydroxy-alpha-methylstilbene diacetate; 4,4'-dihydroxy-alpha,alpha'-dimethylstilbene diacetate; 4,4'-dihydroxy-alpha,alpha'-diethylstilbene diacetate, inertly-substituted derivatives thereof as well as mixtures thereof, is more preferably selected from the group consisting of hydroquinone diacetate; resorcinol diacetate; 4, 4'-dihydroxybiphenyl diacetate; 4,4'-dihydroxy-alpha-methylstilbene diacetate, and is most preferably 4,4'-dihydroxy-alpha-methylstilbene diacetate.

The term "aromatic dicarboxylic acid" as used herein means a compound having two carboxylic groups attached to the same or different aromatic groups. Examples of such include terephthalic acid; isophthalic acid; 2,6-naphthalene-dicarboxylic acid; 1,4-naphthalene-dicarboxylic acid; 1,5-naphthalene-dicarboxylic acid; 4,4'-biphenyl-dicarboxylic acid; 3,4'-biphenyldicarboxylic acid; 4,4"-terphenyldicarboxylic acid; 4,4'-stilbenedicarboxylic acid; 4,4'-dicarboxy-alpha-methylstilbene; 4,4'-dicarboxy-diphenyl ether; inertly-substituted derivatives thereof, as well as mixtures thereof. Preferably, the aromatic dicarboxylic acid is a mixture of 2,6-naphthalene-dicarboxylic acid, terephthalic acid, and optionally, isophthalic acid. Most preferably, the acid is such a mixture wherein, based on the combined molar amounts of all dicarboxylic acids, the terephthalic acid is present in an amount of at least 50 mole percent, the 2,6-naphthalene-dicarboxylic acid is present in an amount of at least 5 mole percent and the isophthalic acid is present in an amount of less than 30 mole percent.

In addition to the aromatic dicarboxylic acids and diesters of aromatic diols present in the reaction mixture, esters of aromatic hydroxycarboxylic acids (wherein the ester group is derived from the phenolic group), amides of aromatic aminocarboxylic acids (wherein the amide group is derived from the aromatic amine group), ester-amides of hydroxyamines, or diamides of aromatic diamines may also be utilized as comonomers. Examples of suitable hydroxycarboxylic acids include 4-hydroxybenzoic acid; 3-hydroxybenzoic acid; 6-hydroxy-2-naphthoic acid; 7-hydroxy-2-naphthoic acid; 5-hydroxy-1-naphthoic acid; 4-hydroxy-1-naphthoic acid; 4-hydroxy-4'-biphenyl-carboxylic acid; 4-hydroxy-4'-carboxydiphenyl ether; 4-hydroxycinnamic acid; inertly-substituted derivatives thereof, as well as mixtures thereof. Most preferably, the ester of the aromatic hydroxycarboxylic acid is p-acetoxybenzoic acid, 6-acetoxy-2-naphthoic acid, or a mixture thereof.

Examples of suitable aminocarboxylic acids include p-aminobenzoic acid; p-N-methylaminobenzoic acid; m-aminobenzoic acid; 3-methyl-4-aminobenzoic acid; 2-chloro-4-aminobenzoic acid; 4-amino-1-naphthoic acid; 4-N-methylamino-1-naphthoic acid; 4-amino-4'-carboxydiphenyl; 4-amino-4'-carboxydiphenyl ether; 4-amino-4'-carboxydiphenyl sulfone; 4-amino-4'-carboxydiphenyl sulfide; and p-aminocinnamic acid. Examples of aromatic diamines and aromatic hydroxyamines include p-aminophenol; p-N-methylaminophenol; p-phenylenediamine; N-methyl-p-phenylenediamine; N,N'-dimethyl-p-phenylenediamine, m-aminophenol; 3-methyl-4-aminophenol; 2-chloro-4-aminophenol; 4-amino-1-naphthol, 4-amino-4'-hydroxydiphenyl; 4-amino-4'-hydroxydiphenyl ether; 4-amino-4'-hydroxydiphenyl methane; 4-amino-4'-hydroxydiphenyl ethane; 4-amino-4'-hydroxydiphenyl sulfone; 4-amino-4'-hydroxydiphenyl sulfide; 4,4'-diaminophenyl sulfide; 4,4'-diaminophenyl sulfone; 2,5-diaminotoluene; 4,4'-ethylenedianiline; and 4,4'-diaminodiphenoxyethane, but is most preferably p-aminophenol.

The acid-, ester-, and amide-containing compounds described above are employed in the polymerization reaction mixture in molar ratios sufficient to obtain a polymer having the desired degree of polymerization and molecular weight, and/or the desired proportion of units derived from a particular monomer. If the presence of other types of groups in the polymer backbone is desired, such as, for example, carbonate groups, carbonate precursors such as diphenyl carbonate may also be employed in the reaction mixture.

In one embodiment, this invention is a process for preparing a polyester which includes the step of heating a reaction mixture comprising (i) diesters of dihydric phenols and $C_{1-10}$ aliphatic monoacids, (ii) dicarboxylic acids, and (iii) a catalytic amount of an organic cation-containing salt, and optionally, (iv) difunctional compounds containing one carboxylic acid group and one aliphatic ester group derived from a phenolic group, under reaction conditions sufficient to form the corresponding polyester, wherein at least 20 mole percent of the combined molar amount of (ii) and (iv) are aromatic dicarboxylic acids. Preferably, at least 50 percent of the combined molar amount of (ii) and (iv) are aromatic dicarboxylic acids, and most preferably, at least 80 percent of such compounds are aromatic dicarboxylic acids.

In another embodiment of the processes of the invention, at least 10 weight percent of the polymer is derived from aromatic dicarboxylic acids and has the formula:

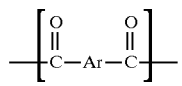

wherein Ar is a $C_{6-20}$ aromatic group and the carbonyl (C=O) groups of the above formula are attached to phenylene or naphthalene groups present in the Ar group. The term "aromatic group" as used herein refers to a group having at least one phenylene or naphthalene group, although it may, in addition, contain other hydrocarbon substituents. The weight percent of units having the formula shown above in the polymer may be readily determined by reference to the mole percent and molecular weight of monomers charged to the polymerization reaction mixture. If oligomers or prepolymers are used, the mole percent and molecular weight of monomers used to prepare such is taken into account in determining the average weight percent of units present in the polymer having the above formula. Examples of suitable Ar groups include 1,4- and 1,3-phenylene; 1,4- 1,5-, and 2,6-naphthalene; 3,4'- and 4,4'-biphenylene; 4,4"-terphenylene; 4,4'-stilbene; and 4,4'-alpha-methylstilbene, as well as substituted forms thereof. More preferably, at least 20 percent by weight of the polymer has such formula, most preferably at least 30 percent by weight.

In addition to the organic salt, other co-catalysts may also be employed. Such co-catalysts are employed to accelerate the esterification of the hydroxyl group(s) of any hydroxyl group-containing monomers with the monoacid chlorides or anhydrides, and/or may have the effect of catalyzing the polycondensation reaction. Examples of suitable co-catalysts include dialkyl tin oxides such as dibutyl tin oxide, diaryl tin oxide, titanium dioxide, alkoxy titanium silicates, titanium alkoxides, alkali and alkaline earth metal salts of carboxylic acids, such as sodium acetate, Lewis acids such as $BF_3$, hydrogen halides such as HCl, and nitrogen bases such as imidazoles and substituted imidazoles, and 4-dimethylaminopyridine and derivatives thereof. The quantity of co-catalyst utilized is preferably in an amount, based on the number of moles of dicarboxylic acid added to the reaction mixture of at least 0.001 percent, more preferably at least 0.005 percent; but is preferably no greater than 5 percent, more preferably no greater than 1 percent.

The monomers and catalyst(s) may be contacted in any suitable reaction vessel such as, for example, an extruder or other mixing device having means to mix and heat the reaction mixture to the appropriate temperature and to remove volatile products of the polycondensation. Initially, the reaction mixture is heated to a temperature above the melt temperature of the diester. The finishing temperature of the process is preferably above the melt temperature of the polymers formed in the reaction mixture. The temperature need not be above the melt temperature of all of the polymers present in the reaction mixture at all times during the polymerization process, but is for at least a portion of the process (preferably at the end of the process), so that a uniform mixture of the polymers may be obtained. Otherwise, the polymerization reaction temperature is preferably as low as will permit the desired molecular weight to be obtained in a relatively short period of time.

If the polymerization reaction is carried out in an extruder with multiple zones having different temperatures, or if the oligomerization is carried out as a batch process and the polymerization is finished in an extruder, the temperature to which the reaction mixture is eventually heated is above the melt temperatures of all polymers in the extrudate, but is preferably at least 5° C. above their melt temperatures, more preferably at least 10° C. above their melt temperatures. Although the particular temperature employed will, of course, depend on the melt temperatures of the polymers formed in the process, examples of finishing temperatures are at least 280° C., more preferably at least 300° C., most preferably at least 310° C.; but preferably no greater than 380° C., more preferably no greater than 360° C.

The resulting polyester prepared by the processes of the invention may be isotropic or liquid crystalline. If a liquid crystalline polymer is desired, at least one monomer used in its preparation should contain a mesogenic group, such as an alkyl-substituted stilbene group. Combinations of monomers and processing conditions which may be used to produce a liquid crystalline polyester polymer are illustrated, for example, in U.S. Ser. No. 08/542,489, filed Oct. 13, 1995, which is hereby incorporated by reference in its entirety. Such polymers preferably have a tensile modulus of greater than 1,000,000, as may be measured using ASTM Method No. D-638. If an isotropic polymer is desired, the use of monomers which do not contain such groups is preferred. For example, an aromatic polyester of a diester of bisphenol A and an aromatic diacid may be prepared using the processes of the invention.

The following examples illustrate the invention, but are not intended to limit it in any way. Unless otherwise stated, all parts and percentages are given by weight.

EXAMPLES 1–3

A 100-mL, single-neck flask is charged with 8.35 g (0.05 mol) of terephthalic acid ("TA"), 3.62 g (0.017 mol) of 2,6-naphthalene-dicarboxylic acid ("NA"), 15.16 g (0.067 mol) of 4,4'-dihydroxy-alpha-methylstilbene ("DHAMS"), 14.36 g (0.141 mol) of acetic anhydride ("AA"), and the following amounts of catalyst:

Example 1 —251 mg (0.67 mmol) of tetraphenylphosphonium chloride,

Example 2 —25.1 mg (0.067 mmol) of tetraphenylphosphonium chloride, and

Example 3 —26.7 mg (0.067 mmol) of tetraphenylphosphonium acetate.

The flask is fitted with a mechanical stirrer, and a distillation head with a graduated receiver. The apparatus is evacuated to 40 mm Hg and vented with nitrogen. The cycle is repeated a total of 5 times. The reaction mixture is brought to a gentle reflux (about 135° C.) and held there for approximately 90 minutes to form the diacetate of DHAMS. The flask is then submerged in a molten salt bath at 180° C. and heated to 300° C. over the course of 52 minutes. The bath is held at 300° C. for 30 minutes and is then ramped to 330° C. over the next 20 minutes and held. The extent of reaction is monitored by recording the volume of acetic acid collected over time. Conversions are calculated as shown below and plotted in FIG. 1. Once the reaction temperature reaches 330° C., the receiver for the acetic acid distillate is frozen in dry ice/methylene chloride and the pressure in the reaction vessel is stepped down to approximately half of its previous value every 5 minutes until approximately 1 mm Hg is reached. The polymerization is continued until the polymer becomes too viscous to efficiently stir. The reaction is then terminated by venting with nitrogen and allowing the reaction mixture to cool.

"Conversion" is defined as follows.

$$\text{Conversion} = \frac{(\text{Volume HOAc Collected}) - (\text{Theoretical Volume HOAc for Acetate Formation})}{(\text{Theoretical Volume HOAc for Polycondensation})}$$

Note that with this definition of conversion, it is possible to have negative conversions early in the reaction before all of the acetic acid generated in the acetate formation step has been distilled from the pot. For example, a polymerization reaction run with a mole ratio of TA/NA/DHAMS/AA of 0.75/0.25/1.0/2.0 can be scaled to generate a total volume of 100 mL of acetic acid ("HOAc"). The first 50 mL of HOAc collected is due to the HOAc liberated during the reaction of DHAMS with acetic anhydride. Any HOAc collected after the initial 50 mL is due to the polycondensation. Accordingly, when 45 mL of HOAc has been collected in the receiver, the conversion will be (45−50)/50=−0.1.

EXAMPLE 4

A 1000-mL, single-neck flask is charged with 102.37 g (0.616 mol) of TA, 15.75 g (0.095 mol) of isophthalic acid, 51.24 g (0.237 mol) of 2,6-naphthalene-dicarboxylic acid, 214.51 g (0.948 mol) of DHAMS, 356 mg (0.950 mmol) of tetraphenylphosphonium chloride, and 203.24 g (1.991 mol) of acetic anhydride. The flask is fitted with a mechanical stirrer, and a distillation head with a graduated receiver. The apparatus is evacuated to 40 mm Hg and vented with nitrogen. The cycle is repeated a total of 5 times. The reaction mixture is brought to a gentle reflux (about 135° C.) and held there for approximately 90 minutes to form the diacetate of DHAMS. The flask is then submerged in a molten salt bath at 180° C. and heated to 290° C. over the course of 55 minutes. The bath is held at 290° C. for 15 minutes and is then ramped to 310° C. over the next 15 minutes and held. Once at 310° C., the receiver for the acetic acid distillate is frozen in dry ice/methylene chloride and the pressure in the reaction vessel is slowly stepped down to 0.1 mm Hg over the course of 40 minutes. The pressure of 0.1 mm Hg is held for 15 minutes before the reaction is terminated because the polymer begins climbing the stir shaft. The polymer is cooled to ambient temperature under a nitrogen atmosphere and then isolated by breaking away the flask to yield 331.8 g of a hemispherical ball of light yellow polymer. The polymer is fractured with a press and chisel and then ground in a Wiley mill. The inherent viscosity of the polymer in pentafluorophenol (0.1 g/dL) at 45° C. is 3.31 dL/g. Differential scanning calorimetry (heating and cooling at 20° C./min) shows a peak melting temperature of 293° C. and a peak crystallizing temperature of 228° C. The sample is injection molded into ⅛"tensile bars on an Arburg Allrounder™ 170 CMD injection molding machine. Tensile properties are measured on an Instron™ 4507 generally following ASTM D-638. Flexural properties are measured on an Instron™ 1125 generally following ASTM D-790. Heat distortion temperatures (DTUL) are measured on a Tinius Olsen™ HD 94 generally following ASTM D-648. Properties are summarized in Table 2.

TABLE 2

| Polymer Injection Molded, ⅛" T-Bars | Example 4 |
| --- | --- |
| Tensile Strength (psi) | 24000 |
| Tensile Modulus (psi) | 2,080,000 |
| Elongation at Break (%) | 2.5 |
| Energy to Break (lbs*in) | 114 |
| Flexural Strength (psi) | 21,500 |
| Flexural Modulus (psi) | 1,660,000 |
| Flexural Strain at Break (%) | 2.07 |
| Melting point (°C.) | 294 |
| Crystallization (°C.) | 228 |
| DTUL (°C., 66/264 psi) | 221/194 |
| $\eta_{inh}$ (dL/g, pentafluorophenol) | 3.31 |

EXAMPLE 5

DHAMS Copolyester Compositions Made Using Phosphonium Salt Catalysts

According to the general synthetic procedure described herein, additional polyesters are prepared as summarized in Table 3. Monomer feed ratios, catalysts, crystallization temperatures, and dilute solution viscosities are tabulated.

TABLE 3

| Repeat Unit Mole Ratios | | | | | Catalysts | | | $T_c$ | $\eta_{inh}$ |
| --- | --- | --- | --- | --- | --- | --- | --- | --- | --- |
| | | | | | DMAP | $R_4P^+X^-$ | | | |
| HBA | TA | IA | NA | D | (%) | $R_4P^+X^-$ | (%) | (°C.) | (dL/g) |
| | 75 | | 25 | 100 | 0 | Ph$_4$PCl | 0.1 | 262 | 3.5 |
| | 75 | | 25 | 100 | 0 | Ph$_4$PCl | 1.0 | 263 | 4.19 |
| | 50 | | 50 | 100 | 0.125 | Bu$_4$POAc | 0.125 | 222 | 2.82 |
| | 67 | | 33 | 100 | 0.125 | Bu$_4$POAc | 0.125 | 243 | 4.53 |
| 70 | 15 | 15 | | 30 | 0.125 | Bu$_4$POAc | 0.125 | 250 | 4.0 |
| 60 | 20 | 20 | | 40 | 0.125 | Bu$_4$POAc | 0.125 | 242 | 4.1 |
| 40 | 30 | 30 | | 60 | 0.125 | Bu$_4$POAc | 0.125 | 233 | 4.4 |
| 20 | 55 | 25 | | 80 | 0.125 | Bu$_4$POAc | 0.125 | 258 | 3.51 |
| 20 | 40 | 40 | | 80 | 0.125 | Bu$_4$POAc | 0.125 | 226 | 4.3 |
| 10 | 65 | 25 | | 90 | 0.125 | Bu$_4$POAc | 0.125 | 259 | 4.8 |

TABLE 3-continued

| | Repeat Unit Mole Ratios | | | | Catalysts | | | |
| --- | --- | --- | --- | --- | --- | --- | --- | --- |
| | | | | | DMAP | | $R_4P^+X^-$ | $T_c$ | $\eta_{inh}$ |
| HBA | TA | IA | NA | D | (%) | $R_4P^+X^-$ | (%) | (°C.) | (dL/g) |
| 70 | 5 | 25 | 100 | 0.125 | Bu$_4$POAc | 0.125 | 242 | 3.88 |
| 65 | 10 | 25 | 100 | 0 | Ph$_4$Cl | 0.1 | 228 | 3.31 |
| 60 | 15 | 25 | 100 | 0 | Ph$_4$POAc | 0.1 | 210 | 3.33 |
| 55 | 20 | 25 | 100 | 0 | Ph$_4$POAc | 0.1 | 1.96 | 2.96 |
| 50 | 25 | 25 | 100 | 0 | Ph$_4$POAc | 0.1 | 172 | 2.54 |
| 65 | 25 | 10 | 100 | 0 | Ph$_4$POAc | 0.1 | 212 | 2.24 |
| 60 | 25 | 15 | 100 | 0 | Ph$_4$POAc | 0.1 | 200 | 2.59 |
| 55 | 25 | 20 | 100 | 0 | Ph$_4$POAc | 0.1 | 184 | 2.91 |

HBA = 4-hydroxybenzoic acid
TA = terephthalic acid
IA = isophthalic acid
NA = 2,6-naphthalene-dicarboxylic acid
D = DHAMS (4,4'-dihydroxy-α-methylstilbene)
DMAP = 4-dimethylaminopyridine
Tc = crystallization temperature
$\eta_{inh}$ = inherent viscosity (pentafluorophenol, 45° C.)
Ph$_4$POAc - tetraphenylphosphonium acetate
Ph$_4$PCl - tetraphenylphosphonium chloride
Bu$_4$POAc - tetrabutylphosphonium acetate
% - mole percent based on charge of DHAMS

What is claimed is:

1. A process for preparing a polyester which includes the step of heating a reaction mixture comprising (i) diesters of dihydric phenols and $C_{1-10}$ aliphatic monoacids, (ii) aromatic dicarboxylic acids, and (iii) a catalytic amount of an organic cation-containing salt at a temperature above the melt temperature of the diesters, under reaction conditions sufficient to form the corresponding polyester.

2. The process of claim 1 wherein the organic cation is a substituted phosphonium cation, wherein each substituent is independently in each occurrence a $C_{1-20}$ alkyl or aryl group.

3. The process of claim 2 wherein the organic cation-containing salt is present in an amount, based on the number of mole of dicarboxylic acid, of at least 0.05 percent.

4. The process of claim 1 wherein the organic cation is tetraphenylphosphonium.

5. The process of claim 1 wherein the organic cation is tetrabutylphosphonium.

6. The process of claim 1 wherein the dihydric phenols comprise 4,4'-dihydroxy-alpha-methylstilbene and the aromatic dicarboxylic acids comprise a mixture of 2,6-naphthalene-dicarboxylic acid, terephthalic acid, and optionally, isophthalic acid, and wherein, based on the combined molar amounts of all dicarboxylic acids, the terephthalic acid is present in an amount of at least 50 mole percent, the 2,6-naphthalene-dicarboxylic acid is present in an amount of at least 5 mole percent and the isophthalic acid is present in an amount of less than 30 mole percent.

7. The process of claim 6 wherein the polyester is liquid crystalline and has a tensile modulus of at least 1,000,000 psi.

8. The process of claim 1 wherein the reaction mixture additionally comprises acetoxybenzoic acid.

9. The process of claim 1 wherein the dihydric phenol is bisphenol A.

10. The process of claim 1 wherein at least 10 weight percent of the polymer is derived from aromatic dicarboxylic acids and has the formula:

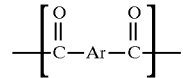

wherein Ar is a $C_{6-20}$ aromatic group and the carbonyl (C=O) groups of the above formula are attached to phenylene or naphthalene groups present in the Ar group.

11. The process of claim 10 wherein each Ar is selected from the group consisting of p-phenylene, m-phenylene, and 2,6-naphthalene.

12. A process for preparing a polyester which includes the step of heating a reaction mixture comprising (i) diesters of dihydric phenols and $C_{1-10}$ aliphatic monoacids, (ii) dicarboxylic acids, and (iii) a catalytic amount of an organic cation-containing salt, and optionally, (iv) compounds containing one carboxylic acid group and one aliphatic ester group derived from a phenolic group, under reaction conditions sufficient to form the corresponding polyester, wherein at least 20 mole percent of the combined molar amount of (ii) and (iv) are aromatic dicarboxylic acids.

13. The process of claim 12 wherein at least 50 percent of the combined molar amount of (ii) and (iv) are aromatic dicarboxylic acids.

14. The process of claim 13 wherein the dihydric phenol is bisphenol A.

15. The process of claim 12 wherein at least 80 percent of the combined molar amount of (ii) and (iv) are aromatic dicarboxylic acids.

16. The process of claim 12 wherein the organic cation is substituted phosphonium cation, wherein each substituent is independently in each occurrence a $C_{1-20}$ alkyl or aryl group.

17. The process of claim 16 wherein the organic cation-containing salt is present in an amount, based on the number of moles of dicarboxylic acid, of at least 0.05 percent.

18. The process of claim 12 wherein the organic cation is tetraphenylphosphonium.

19. The process of claim 12 wherein the organic cation is tetrabutylphosphonium.

20. The process of claim 12 wherein the dihydric phenol consists of 4,4'-dihydroxy-alpha-methylstilbene and the aromatic dicarboxylic acids comprise a mixture of 2,6- naphthalene-dicarboxylic acid, terephthalic acid and, optionally, isophthalic acid, and wherein, based on the combined molar amounts of all dicarboxylic acids, the terephthalic acid is present in an amount of at least 50 mole percent, the 2,6-naphthalene-dicarboxylic acid is present in an amount of at least 5 mole percent and the isophthalic acid is present in an amount of less than 30 mole percent.

21. The process of claim 20 wherein the polyester is liquid crystalline and has a tensile modulus of at least 1,000,000 psi.

22. The process of claim 12 wherein at least 10 weight percent of the polymer is derived from aromatic dicarboxylic acids and has the formula:

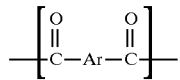

wherein Ar is a $C_{6-20}$ aromatic group and the carbonyl (C=O) groups of the above formula are attached to phenylene or naphthalene groups present in the Ar group.

23. The process of claim 22 wherein each Ar is selected from the group consisting of p-phenylene, m-phenylene, and 2,6-naphthalene.

24. The process of claim 1 wherein the reaction mixture is heated to a temperature of at least 280° C.

25. The process of claim 1 wherein the reaction mixture is heated to a temperature of at least 300° C.

26. The process of claim 12 wherein the reaction mixture is heated to a temperature of at least 280° C.

27. The process of claim 12 wherein the reaction mixture is heated to a temperature of at least 300° C.

* * * * *